(12) United States Patent
Kammer

(10) Patent No.: US 12,173,693 B2
(45) Date of Patent: Dec. 24, 2024

(54) METHOD AND SYSTEM FOR DAMPING A WIND TURBINE TOWER

(71) Applicant: General Electric Company, Schenectady, NY (US)

(72) Inventor: Leonardo Cesar Kammer, Niskayuna, NY (US)

(73) Assignee: GE Infrastructure Technology LLC, Greenville, SC (US)

(*) Notice: Subject to any disclaimer, the term of this patent is extended or adjusted under 35 U.S.C. 154(b) by 11 days.

(21) Appl. No.: 17/951,180

(22) Filed: Sep. 23, 2022

(65) Prior Publication Data

US 2024/0102448 A1 Mar. 28, 2024

(51) Int. Cl.
*F03D 7/02* (2006.01)

(52) U.S. Cl.
CPC ......... *F03D 7/0296* (2013.01); *F03D 7/0224* (2013.01); *F05B 2260/964* (2013.01)

(58) Field of Classification Search
CPC .... F03D 7/0224; F03D 7/0296; F03D 7/0276; F03D 7/0298; F03D 7/0302; F05B 2270/334; F05B 2260/96; F05B 2260/964
See application file for complete search history.

(56) References Cited

U.S. PATENT DOCUMENTS

| | | | |
|---|---|---|---|
| 10,400,754 B2 | 9/2019 | Rodriguez Tsouroukdissian | |
| 10,408,194 B2 | 9/2019 | Drobietz et al. | |
| 10,619,623 B2* | 4/2020 | Caponetti | F03D 7/024 |
| 10,982,651 B2* | 4/2021 | Caponetti | F03D 7/042 |
| 11,118,646 B2 | 9/2021 | Jiang et al. | |
| 2008/0145222 A1 | 6/2008 | Schellings | |
| 2018/0245568 A1* | 8/2018 | Pedersen | F03D 7/0244 |

FOREIGN PATENT DOCUMENTS

| | | | | |
|---|---|---|---|---|
| CN | 108087194 A | * | 5/2018 | ............... F03D 7/00 |
| WO | WO2017036481 A1 | | 3/2017 | |

OTHER PUBLICATIONS

"Investigation of a Speed Exclusion Zone to Prevent Tower Resonance in Variable-Speed Wind Turbines"; John Licari; Oct. 2013; IEEE Transactions on Sustainable Energy, vol. 4 (Year: 2013).*
European Search Report EP23198618 on Feb. 6, 2024.
Bossanyi, Wind Turbine Control for Load Reduction, XP07909578, Wind Energy, vol. 6, 2003, 229-244.
Yang et al., Comparative Studies on Control Systems for a Two-Blade Variable-Speed Wind Turbine with a Speed Exclusion Zone, XP29696286, Energy, vol. 109, 2016, 294-309.

* cited by examiner

*Primary Examiner* — Justin D Seabe
(74) *Attorney, Agent, or Firm* — Dority & Manning, P.A.

(57) ABSTRACT

A method for damping oscillations in a tower of a wind turbine includes determining a primary rotational frequency of the rotor (fp) that correlates to a tower resonance frequency (fr). The method defines an exclusion zone between a first rotational frequency of the rotor (f1) that is less than the primary rotational frequency (fp) and a second rotational frequency of the rotor (f2) that is greater than the primary rotational frequency (fp). At rotor frequencies below the exclusion zone, a first tower-damping force strategy is applied. At rotor frequencies above the exclusion zone, a second tower-damping force strategy is applied that is different from the first tower-damping force strategy.

12 Claims, 5 Drawing Sheets

METHOD AND SYSTEM FOR DAMPING A WIND TURBINE TOWER

FIELD

The present disclosure relates in general to wind turbine power generating systems, and more particularly to systems and methods for damping oscillations in the wind turbine tower.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Like most dynamic systems, wind turbines are subject to undesirable vibrations that may detrimentally impact the operation and/or structural integrity of the wind turbine. In addition, such vibrations may contribute to undesirable noise in the area surrounding the wind turbine. For example, vibrations generated by the drivetrain can be radiated as sound by the tower structure, thereby significantly contributing to an audible tonality in the vicinity of the wind turbine. This noise can be a nuisance to neighbors of the wind turbine as well as personnel working at the wind turbine site.

A particular concern is tower oscillations occurring when the rotor speed coincides with the natural or resonance frequency (also referred to as the eigen frequency) of the wind turbine tower, which results in significantly increased bending moments and increased fatigue loads. This issues occurs when the tower is "soft", meaning that the resonance frequency of the tower lies within operational range of the rotor. Vibrations in the drive train may also cause the wind turbine tower to resonate if the frequency of the torsional moment coincides with the resonance frequency of the wind turbine tower.

A conventional solution involves increase the structural strength of the wind turbine tower by adding additional material so as to move the resonance frequency of the tower outside of the operating frequency range of the rotor. However, this solution increases the weight and costs of the wind turbine tower.

Another proposed solution is to create an exclusion zone where the rotor speed moves quickly through the tower resonance frequency. However, this exclusion zone can be relatively large to effectively mitigate tower oscillations in modern large-scale wind turbines, which is detrimental to overall power production of the wind turbine.

WO 2017036481 proposes a method for operating a wind turbine with a speed exclusion zone, including a control system monitors vibrations of the tower and rotational speed of the rotor. The control system controls the rotational speed of the rotor based on the measured vibration level and uses the exclusion zone to avoid rotational speeds that coincide with the eigenfrequency of the wind turbine tower. The width of the exclusion zone is adjusted or varied as a function of the measured vibration signal.

The industry would benefit from a method and associated control system that utilizes the benefits of an exclusion zone to minimize tower oscillations while significantly reducing the negative impact of relatively large exclusions zones associated with conventional methods.

BRIEF DESCRIPTION

Aspects and advantages of the invention will be set forth in part in the following description, or may be obvious from the description, or may be learned through practice of the invention.

The present disclosure encompasses a method for damping oscillations in a tower of a wind turbine, wherein the wind turbine includes a rotor with a plurality of rotor blades, and a wind turbine controller. The method includes: (a) determining a primary rotational frequency of the rotor (fp) that correlates to a tower resonance frequency (fr) that induces oscillations in the tower; (b) defining an exclusion zone between a first rotational frequency of the rotor (f1) that is less than the primary rotational frequency (fp) and a second rotational frequency of the rotor (f2) that is greater than the primary rotational frequency (fp); (c) at rotor frequencies below the exclusion zone, applying a first tower-damping force strategy; and (d) at rotor frequencies above the exclusion zone, applying a second tower-damping force strategy that is different from the first tower-damping force strategy.

In a particular embodiment, the first tower-damping strategy comprises applying a damping force that pushes a tower frequency in a first direction relative to the tower resonance frequency (fr); and the second-tower damping strategy comprises applying a damping force that pushes the tower frequency in a second direction relative to the tower resonance frequency (fr) that is opposite to the first direction. For example, the first direction of the damping force may push the tower frequency to greater than the tower resonance frequency (fr), and the second direction of the damping force may push the tower frequency to less than the tower resonance frequency (fr).

In certain embodiments, the first rotational frequency (f1) and the second rotational frequency (f2) are defined such that the exclusion zone is equal to or less than +/−3% of the primary rotational frequency (fp).

The wind turbine may include a generator with a generator rotor that produces rotational torque, wherein application of the first and second tower-damping strategies may include controlling the generator with the wind turbine controller to vary the rotational torque from the generator rotor that is imparted to the tower. In this embodiment, the intent may be to damp tower oscillations that are primarily lateral oscillations generally perpendicular to an axis of the rotor.

The wind turbine may include a pitch control system, wherein application of the first and second tower-damping strategies comprises varying a pitch angle of the rotor blades with the pitch control system to change the rotational frequency of the rotor. In this embodiment, the intent may be to damp tower oscillations that are primarily longitudinal oscillations generally parallel to an axis of the rotor.

The present disclosure also encompasses a wind turbine that incorporates and combination of the functionalities discussed above. The wind turbine includes a plurality of rotor blades on a rotatable rotor hub; a pitch system configured to change a pitch angle of the rotor blades; a generator with a generator rotor; and a controller, in operable communication with the pitch system and the controller. The controller is configured to: (a) determine a primary rotational frequency of the rotor (fp) that correlates to a tower resonance frequency (fr) that induces oscillations in the tower; (b) defining an exclusion zone between a first rotational frequency of the rotor (f1) that is less than the primary rotational frequency (fp) and a second rotational frequency of the rotor (f2) that is greater than the primary rotational frequency (fp); (c) at rotor frequencies below the exclusion zone, applying a first tower-damping force strategy; and (d) at rotor frequencies above the exclusion zone, applying a second tower-damping force strategy that is different from the first tower-damping force strategy.

In certain embodiments, the controller may be configured such that the first tower-damping strategy includes applying a damping force that pushes a tower frequency in a first direction relative to the tower resonance frequency (fr); and the second-tower damping strategy includes applying a damping force that pushes the tower frequency in a second direction relative to the tower resonance frequency (fr) that is opposite to the first direction. For example, the first direction of the damping force may push the tower frequency to greater than the tower resonance frequency (fr), and the second direction of the damping force pushes the tower frequency to less than the tower resonance frequency (fr).

The controller may be configured to establish the first rotational frequency (f1) and the second rotational frequency (f2) such that the exclusion zone is equal to or less than +/−3% of the primary rotational frequency (fp).

The controller may be further configured such that application of the first and second tower-damping strategies includes controlling the generator to vary the rotational torque from the generator rotor that is imparted to the tower to primarily damp lateral oscillations that are generally perpendicular to an axis of the rotor.

The controller may be further configured such that application of the first and second tower-damping strategies includes controlling the pitch control system to vary a pitch angle of the rotor blades to change the rotational frequency of the rotor to primarily damp longitudinal oscillations that are generally parallel to an axis of the rotor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
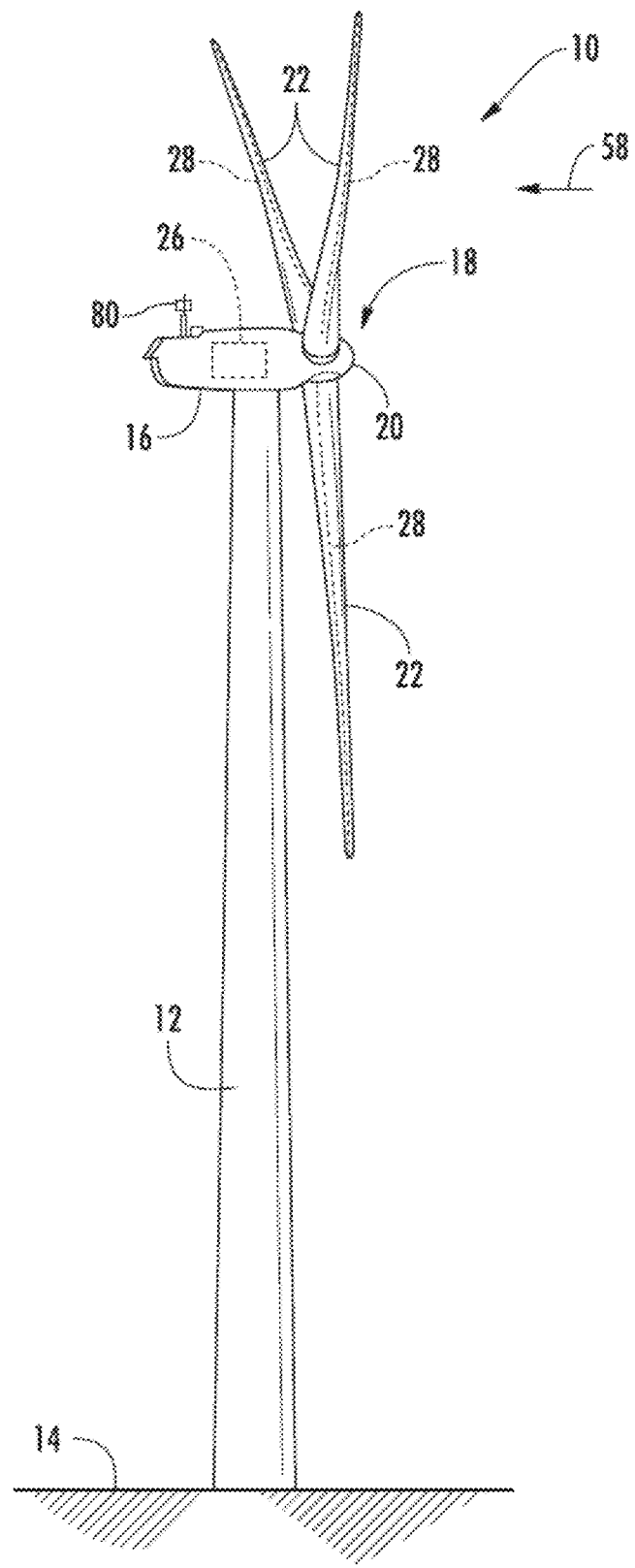
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. As discussed above, aspects of the present methodology and related systems are premised on controlling operation of a wind turbine to minimize tower vibrations without the disadvantages of a conventional exclusion zone. The present methodology significantly reduces or eliminates the exclusion zone by controlling the operational rotational frequency of the generator rotor according to different control strategies depending on which side of a primary rotational frequency of the generator is operating, wherein the primary rotational frequency corresponds to the a resonance frequency of the tower. For purposes of an understanding and appreciation of the invention, a conventional wind turbine configuration is described below. It should be appreciated however that the present methodology is not limited to the wind turbine configuration described herein and can be practiced on any wind turbine wherein it is desired to minimize tower oscillations.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
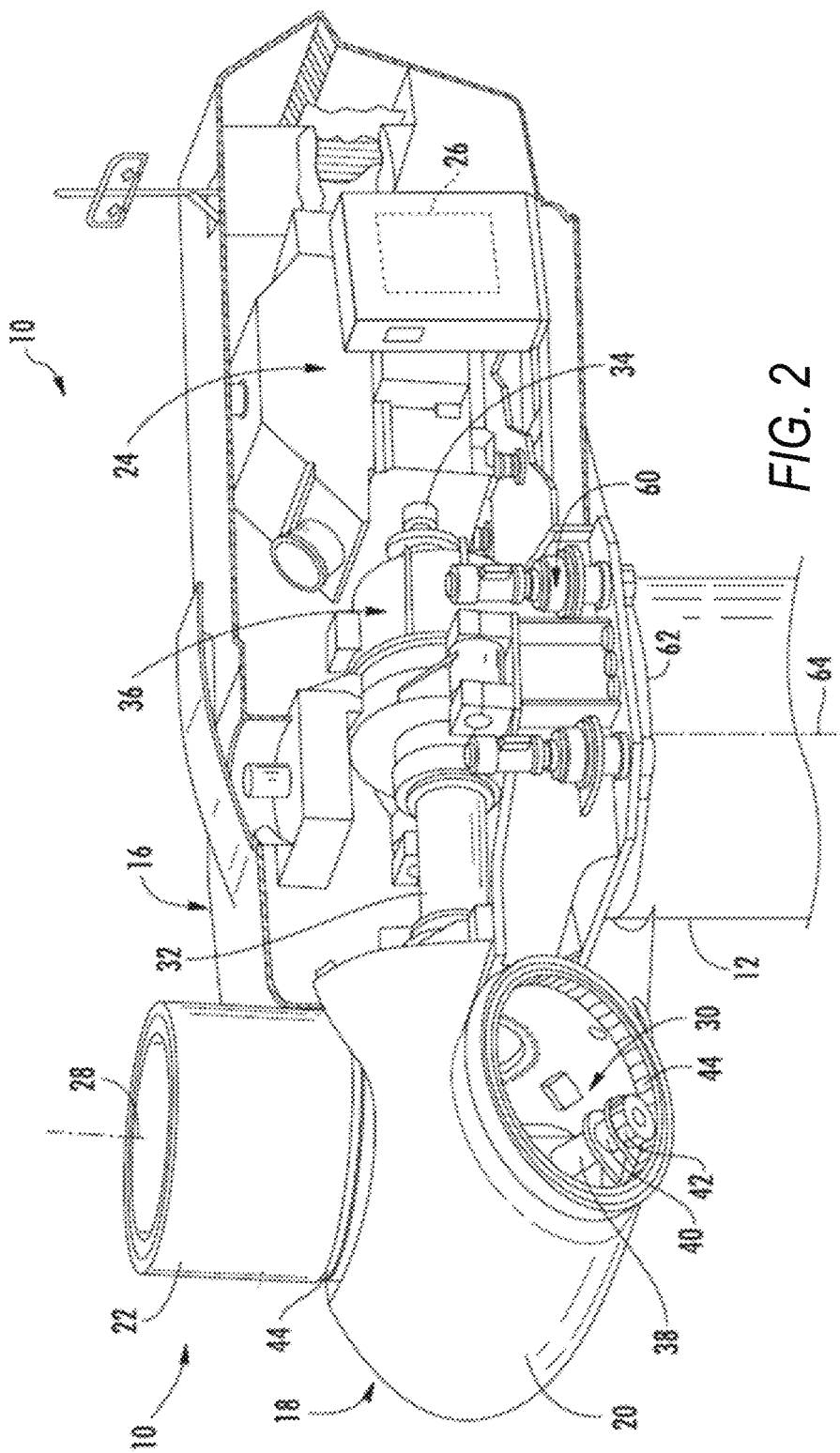
FIG. 2 illustrates an enlarged sectional view of a portion of the wind turbine shown in FIG. 1.

The wind turbine 10 may also include a turbine control system or turbine controller 26 centralized within the nacelle 16. In general, the turbine controller 26 may include a computer or other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. In addition, the turbine controller 26 may control the orientation of the nacelle 16 with respect to the wind direction 58 by transmitting suitable control signals to one or more yaw drive mechanisms 60 that engage a yaw bearing 62 (FIG. 2). Thus, rotation of the yaw bearing 62 changes the orientation of the nacelle 16.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator rotor 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator rotor 34 and, thus, the generator 24.

Additionally, the turbine controller 26 may also be located within the nacelle 16. As is generally understood, the turbine controller 26 may be communicatively coupled to any number of the components of the wind turbine 10 in order to control the operation of such components. For example, as indicated above, the turbine controller 26 may be communicatively coupled to a pitch control system that includes individual pitch adjustment mechanisms 30 that facilitate rotation of each rotor blade 22 about its pitch axis 28.

In general, each pitch adjustment mechanism 30 may include any suitable components and may have any suitable configuration that allows the pitch adjustment mechanism 30 to function as described herein. For example, in several embodiments, each pitch adjustment mechanism 30 may include a pitch drive motor 38 (e.g., any suitable electric motor), a pitch drive gearbox 40, and a pitch drive pinion 42. In such embodiments, the pitch drive motor 38 may be coupled to the pitch drive gearbox 40 so that the pitch drive motor 38 imparts mechanical force to the pitch drive gearbox 40. Similarly, the pitch drive gearbox 40 may be coupled to the pitch drive pinion 42 for rotation therewith. The pitch drive pinion 42 may, in turn, be in rotational engagement with a pitch bearing 44 coupled between the hub 20 and a corresponding rotor blade 22 such that rotation of the pitch drive pinion 42 causes rotation of the pitch bearing 44. Thus, in such embodiments, rotation of the pitch drive motor 38 drives the pitch drive gearbox 40 and the pitch drive pinion 42, thereby rotating the pitch bearing 44 and the rotor blade 22 about the pitch axis 28. In alternative embodiments, it should be appreciated that each pitch adjustment mechanism 30 may have any other suitable configuration that facilitates rotation of a rotor blade 22 about its pitch axis 28.

During operation of the wind turbine 10, the drivetrain assembly (i.e. the generator 24, the gearbox 36, and the corresponding shafts 32, 34) cause vibrations that are generated as sound throughout the nacelle 16 and the tower 12, particularly the upper portion of the tower 12. Such vibrations contribute significantly to an audible tonality in the vicinity of the turbine 10. More specifically, the drivetrain assembly may cause tower surface vibrations that generate noise that can be a nuisance to neighbors of the wind turbine 10. Thus, FIG. 3 and illustrate schematic diagrams of various embodiments of a system 100 for reducing audible tonality near a wind turbine (e.g. the tower 12 of wind turbine 10) that addresses the aforementioned issues.

Figure 3:
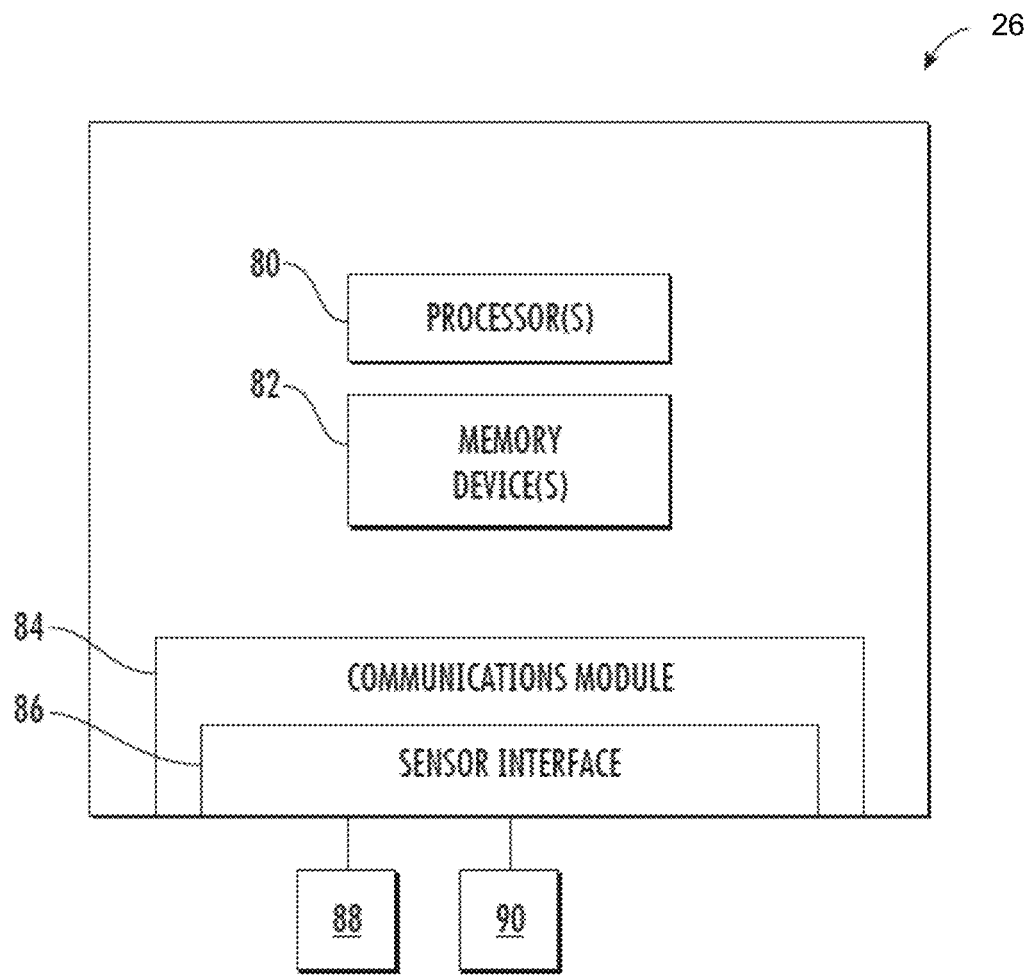
FIG. 3 illustrates a block diagram of one embodiment of suitable components that may be included in a controller of a wind turbine according to the present disclosure.

Referring now to FIG. 3, a block diagram of one embodiment of suitable components that may be included within the controller 26 in accordance with aspects of the present disclosure is illustrated. It should be understood that the various components of the controller of FIG. 3 may be applicable to any suitable controller, including for example, a turbine controller, a farm-level controller, a supervisory controller, and/or other suitable control system.

As shown, the controller 26 may include one or more processor(s) 80 and associated memory device(s) 82 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 82 may generally include memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Additionally, the controller 26 may also include a communications module 84 to facilitate communications between the controller 36 and the various components of the wind turbine 10. For instance, the communications module 84 may include a sensor interface 86 (e.g., one or more analog-to-digital converters) to permit the signals transmitted by one or more sensors 88, 90 to be converted into signals that can be understood and processed by the controller 26. It should be appreciated that the sensors 88, 90 may be communicatively coupled to the communications module 84 using any suitable means. For example, as shown in FIG. 3, the sensors 88, 90 are coupled to the sensor interface 86 via a wired connection. However, in other embodiments, the sensors 88, 90 may be coupled to the sensor interface 86 via a wireless connection, such as by using any suitable wireless communications protocol known in the art. As such, the processor 80 may be configured to receive one or more signals from the sensors 88, 90.

The sensors 88, 90 of the wind turbine 10 may be any suitable sensors configured to measure any operational condition and/or wind parameter at or near the wind turbine 10. For example, the sensors 88, 90 may include blade sensors for measuring a pitch angle of one of the rotor blades 22; generator sensors for monitoring the generator 24 (e.g., torque, rotational speed, acceleration and/or the power output); and/or various wind sensors for measuring various wind parameters. In addition, the sensors 88, 90 may be located near the ground of the wind turbine 10, on the nacelle 16, and/or on the meteorological mast 58.

The sensors 88, 90 may also include accelerometers mounted on the tower 12 or nacelle 16 that detect oscillations of the tower. The frequency of the rotor 18 at the detected tower oscillations may be used to designate the primary rotational frequency of the rotor (fp). Alternatively, the primary rotational frequency of the rotor (fp) may be predetermined and known for specific wind turbine designs or configurations, or may be determined via modeling or based on past operational data.

Referring to FIGS. and 5, an embodiment of a method 100 for damping oscillations in a tower of a wind turbine is depicted. As discussed above, the wind turbine includes a rotor with a plurality of rotor blades and a wind turbine controller. The method is premised on the principle that the wind turbine tower by itself is a system with a given natural frequency. The tower with an active damping loop, however, becomes a different system having a different resonance frequency. As long as the damping loop is active, the "tower+control (damping loop)" system can still maintain a desired margin (e.g., a 7% margin) to the operating rotor frequency via a smaller exclusion zone (e.g. 3%) and a smart switching of the damping strategy to move the "tower+control" system's resonance frequency in a desirable direction. The desirable direction becomes a function of which side of the exclusion zone the rotor speed setpoint is operating.

At step 102, the method includes determining a primary rotational frequency of the rotor (fp) that correlates to a tower resonance frequency (fr) that induces oscillations in the tower. As discussed above, this frequency may be predetermined or it may be determined based on current operation of the wind turbine.

At step 104, the method 100 includes defining an exclusion zone between a first rotational frequency of the rotor (f1) that is less than the primary rotational frequency (fp) and a second rotational frequency of the rotor (f2) that is greater than the primary rotational frequency (fp). The frequencies (f1) and (f2) may be defined based on a percentage band centered on the primary rotational frequency (fp). In a particular embodiment, the first rotational frequency (f1) and the second rotational frequency (f2) are defined such that the exclusion zone is equal to or less than +/−3% of the primary rotational frequency (fp). This value is significantly less than conventional exclusions zones, which generally are about +/−7% of the primary rotational frequency (fp).

At step 106, the method 100 includes monitoring the rotor frequency of the operational wind turbine, for example by use of any suitable sensor that detects rotations of the rotor.

At step 108 and 110, the method 100 includes determining whether the rotor frequency is above (110) or below (108) the exclusion zone.

At step 112, for rotor frequencies below the exclusion zone, the method 100 includes applying a first tower-damping force strategy. Likewise, for rotor frequencies above the exclusion zone, the method 100 applies a second tower-damping strategy. The first and second tower-damping strategies are different in that apply a force having a different magnitude or direction to the rotor depending on which side of the exclusion zone the rotor is operating.

Figure 4:
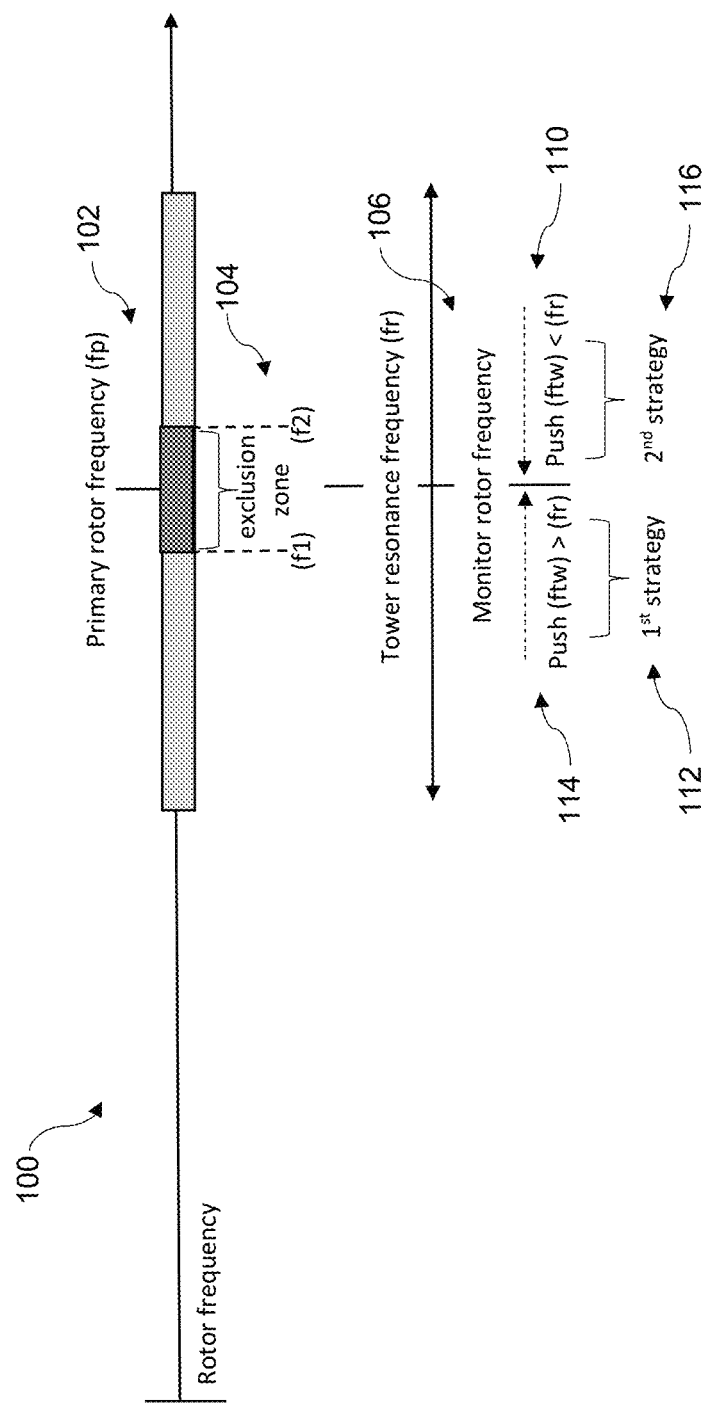
FIG. 4 is a diagram representing concepts of the present method.
Figure 5:
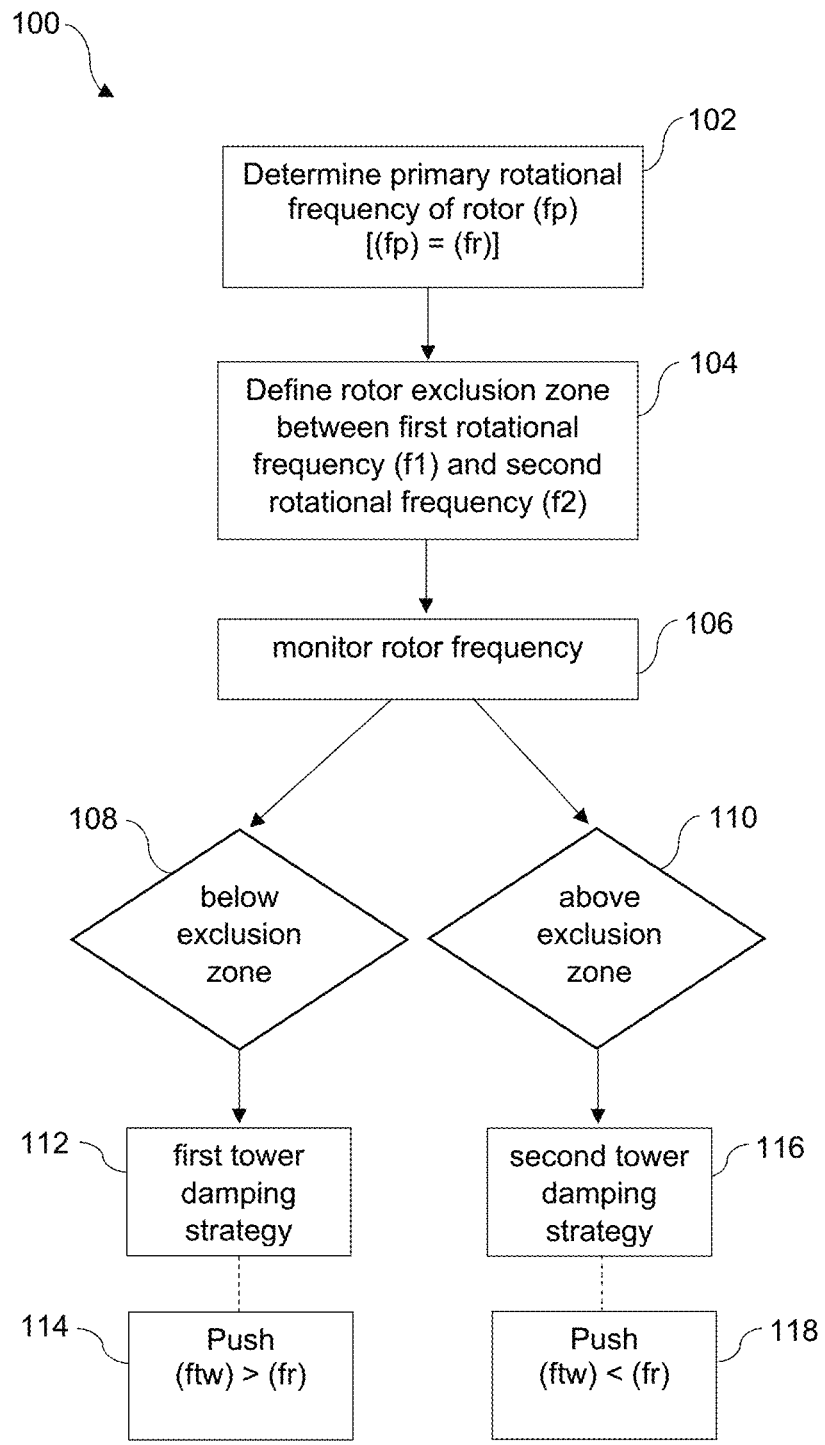
FIG. 5 is a block diagram depicting an embodiment of the present method. Repeat use of reference characters in the present specification and drawings is intended to represent the same or analogous features or elements of the present invention.

Still referring to FIGS. 4 and 5, in a particular embodiment, the first tower-damping strategy applies a damping force that pushes a tower frequency (ftw) in a first direction relative to the tower resonance frequency (fr). The second tower-damping strategy applies a damping force that pushes the tower frequency (ftw) in a second direction relative to the tower resonance frequency (fr) that is opposite to the first direction. For example, the first direction of the damping force may push the tower frequency (ftw) to greater than the tower resonance frequency (fr), and the second direction of the damping force may push the tower frequency (ftw) to less than the tower resonance frequency (fr).

The damping strategies may include any means to impart a force to the tower that will change or affect the resonance frequency of the tower or reduce the oscillations induced at the tower resonance frequency. In one embodiment, application of the first and second tower-damping strategies includes controlling the generator with the wind turbine controller to vary the rotational torque from the generator rotor that is imparted to the tower. This control strategy is particularly useful in damping primarily lateral tower oscillations that are generally perpendicular to an axis of the rotor.

In an alternate embodiment, or in addition to controlling the generator rotor as discussed above, application of the first and second tower-damping strategies may include varying a pitch angle of the rotor blades with the pitch control system to change the rotational frequency of the rotor, which will in turn affect the vibrational frequency of the tower. This control strategy is particularly useful in damping primarily longitudinal tower oscillations that are generally parallel to an axis of the rotor.

As mentioned, the present invention also encompasses a wind turbine that is configured to carry out any one or combination of the methodologies described above. In particular, referring to FIGS. 1 and 2, an embodiment of the wind turbine 10 includes a controller 26 that is configured to: (a) determine a primary rotational frequency of the rotor (fp) that correlates to a tower resonance frequency (fr) that induces oscillations in the tower; (b) defining an exclusion zone between a first rotational frequency of the rotor (f1) that is less than the primary rotational frequency (fp) and a second rotational frequency of the rotor (f2) that is greater than the primary rotational frequency (fp); (c) at rotor frequencies below the exclusion zone, applying a first tower-damping force strategy; and (d) at rotor frequencies above the exclusion zone, applying a second tower-damping force strategy that is different from the first tower-damping force strategy.

Further aspects of the invention are provided by the subject matter of the following clauses:

Clause 1: A method for damping oscillations in a tower of a wind turbine, wherein the wind turbine includes a rotor with a plurality of rotor blades, and a wind turbine controller, the method comprising: (a) determining a primary rotational frequency of the rotor (fp) that correlates to a tower resonance frequency (fr) that induces oscillations in the tower; (b) defining an exclusion zone between a first rotational frequency of the rotor (f1) that is less than the primary rotational frequency (fp) and a second rotational frequency of the rotor (f2) that is greater than the primary rotational frequency (fp); (c) at rotor frequencies below the exclusion zone, applying a first tower-damping force strategy; and (d) at rotor frequencies above the exclusion zone, applying a second tower-damping force strategy that is different from the first tower-damping force strategy.

Clause 2: The method according to clause 1, wherein the first tower-damping strategy comprises applying a damping force that pushes a tower frequency (ftw) in a first direction relative to the tower resonance frequency (fr); and the second-tower damping strategy comprises applying a damping force that pushes the tower frequency (ftw) in a second direction relative to the tower resonance frequency (fr) that is opposite to the first direction.

Clause 3: The method according to any one of clauses 1-2, wherein the first direction of the damping force pushes the tower frequency (ftw) to greater than the tower resonance frequency (fr), and the second direction of the damping force pushes the tower frequency (ftw) to less than the tower resonance frequency (fr).

Clause 4: The method according to any one of clauses 1-3, wherein the first rotational frequency (f1) and the second rotational frequency (f2) are defined such that the exclusion zone is equal to or less than +/−3% of the primary rotational frequency (fp).

Clause 5: The method according to any one of clauses 1-4, wherein the wind turbine comprises a generator with a generator rotor that produces rotational torque, wherein application of the first and second tower-damping strategies comprises controlling the generator with the wind turbine controller to vary the rotational torque from the generator rotor that is imparted to the tower.

Clause 6: The method according to any one of clauses 1-5, wherein the tower oscillations being damped are primarily lateral oscillations generally perpendicular to an axis of the rotor.

Clause 7: The method according to any one of clauses 1-6, herein the wind turbine comprises a pitch control system, wherein application of the first and second tower-damping strategies comprises varying a pitch angle of the rotor blades with the pitch control system to change the rotational frequency of the rotor.

Clause 8: The method according to any one of clauses 1-7, wherein the tower oscillations being damped are primarily longitudinal oscillations generally parallel to an axis of the rotor.

Clause 9: The method according to any one of clauses 1-8, wherein the wind turbine comprises a pitch control system and a generator with a generator rotor that produces rotational torque, wherein application of the first and second tower-damping strategies comprises: controlling the generator with the wind turbine controller to vary the rotational torque from the generator rotor that is imparted to the tower to dampen primarily lateral tower oscillations; and varying a pitch angle of the rotor blades with the pitch control system to change the rotational frequency of the rotor to dampen primarily longitudinal tower oscillations.

Clause 10: A wind turbine, comprising: a plurality of rotor blades on a rotatable rotor hub; a pitch system configured to change a pitch angle of the rotor blades; a generator with a generator rotor; a controller, in operable communication with the pitch system and the controller, the controller configured to: (a) determine a primary rotational frequency of the rotor (fp) that correlates to a tower resonance frequency (fr) that induces oscillations in the tower; (b) defining an exclusion zone between a first rotational frequency of the rotor (f1) that is less than the primary rotational frequency (fp) and a second rotational frequency of the rotor (f2) that is greater than the primary rotational frequency (fp); (c) at rotor frequencies below the exclusion zone, applying a first tower-damping force strategy; and (d) at rotor frequencies above the exclusion zone, applying a second tower-damping force strategy that is different from the first tower-damping force strategy.

Clause 11: The wind turbine according to clause 10, wherein the first tower-damping strategy comprises applying a damping force that pushes a tower frequency (ftw) in a first direction relative to the tower resonance frequency (fr); and the second-tower damping strategy comprises applying a damping force that pushes the tower frequency (ftw) in a second direction relative to the tower resonance frequency (fr) that is opposite to the first direction.

Clause 12: The wind turbine according to any one of clauses 10-11, wherein the first direction of the damping force pushes the tower frequency (ftw) to greater than the tower resonance frequency (fr), and the second direction of the damping force pushes the tower frequency (ftw) to less than the tower resonance frequency (fr).

Clause 13: The wind turbine according to any one of clauses 10-12, wherein the first rotational frequency (f1) and the second rotational frequency (f2) are defined such that the exclusion zone is equal to or less than +/−3% of the primary rotational frequency (fp).

Clause 14: The wind turbine according to any one of clauses 10-13, further comprising a generator with a generator rotor that produces rotational torque, wherein application of the first and second tower-damping strategies comprises controlling the generator with the wind turbine controller to vary the rotational torque from the generator rotor that is imparted to the tower to primarily damp lateral oscillations that are generally perpendicular to an axis of the rotor.

Clause 15: The wind turbine according to any one of clauses 10-14, further comprising a pitch control system, wherein application of the first and second tower-damping strategies comprises varying a pitch angle of the rotor blades with the pitch control system to change the rotational frequency of the rotor to primarily damp longitudinal oscillations that are generally parallel to an axis of the rotor.

Clause 16: The wind turbine according to any one of clauses 10-15, further comprising: a generator with a generator rotor that produces rotational torque, wherein application of the first and second tower-damping strategies comprises controlling the generator with the wind turbine controller to vary the rotational torque from the generator rotor that is imparted to the tower to primarily damp lateral oscillations that are generally perpendicular to an axis of the rotor; and a pitch control system, wherein application of the first and second tower-damping strategies comprises varying a pitch angle of the rotor blades with the pitch control system to change the rotational frequency of the rotor to primarily damp longitudinal oscillations that are generally parallel to an axis of the rotor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for damping oscillations in a tower of a wind turbine, wherein the wind turbine includes a rotor with a plurality of rotor blades, and a wind turbine controller, the method comprising:
   (a) determining a primary rotational frequency of the rotor (fp) that correlates to a tower resonance frequency (fr) that induces oscillations in the tower;
   (b) defining an exclusion zone between a first rotational frequency of the rotor (f1) that is less than the primary rotational frequency (fp) and a second rotational frequency of the rotor (f2) that is greater than the primary rotational frequency (fp);
   (c) at rotor frequencies below the exclusion zone, applying a first tower-damping force strategy that increases a tower frequency (ftw) towards or greater than the tower resonance frequency (fr); and (d) at rotor frequencies above the exclusion zone, applying a second tower-damping force strategy that that decreases the tower frequency (ftw) towards or less the tower resonance frequency (fr).

2. The method according to claim 1, wherein the first rotational frequency (f1) and the second rotational frequency (f2) are defined such that the exclusion zone is equal to or less than +/−3% of the primary rotational frequency (fp).

3. The method according to claim 1, wherein the wind turbine comprises a generator with a generator rotor that produces rotational torque, wherein application of the first and second tower-damping strategies comprises controlling the generator with the wind turbine controller to vary the rotational torque from the generator rotor that is imparted to the tower.

4. The method according to claim 3, wherein the tower oscillations being damped are primarily lateral oscillations generally perpendicular to an axis of the rotor.

5. The method according to claim 1, wherein the wind turbine comprises a pitch control system, wherein application of the first and second tower-damping strategies comprises varying a pitch angle of the rotor blades with the pitch control system to change the rotational frequency of the rotor.

6. The method according to claim 5, wherein the tower oscillations being damped are primarily longitudinal oscillations generally parallel to an axis of the rotor.

7. The method according to claim 1, wherein the wind turbine comprises a pitch control system and a generator with a generator rotor that produces rotational torque, wherein application of the first and second tower-damping strategies comprises:
  controlling the generator with the wind turbine controller to vary the rotational torque from the generator rotor that is imparted to the tower to dampen primarily lateral tower oscillations; and
  varying a pitch angle of the rotor blades with the pitch control system to change the rotational frequency of the rotor to dampen primarily longitudinal tower oscillations.

8. A wind turbine, comprising:
  a plurality of rotor blades on a rotatable rotor hub;
  a pitch system configured to change a pitch angle of the rotor blades;
  a generator with a generator rotor;
  a controller, in operable communication with the pitch system and the controller, the controller configured to:
  (a) determine a primary rotational frequency of the rotor (fp) that correlates to a tower resonance frequency (fr) that induces oscillations in the tower;
  (b) define an exclusion zone between a first rotational frequency of the rotor (f1) that is less than the primary rotational frequency (fp) and a second rotational frequency of the rotor (f2) that is greater than the primary rotational frequency (fp);
  (c) at rotor frequencies below the exclusion zone, apply a first tower-damping force strategy that increases a tower frequency (ftw) towards or greater than the tower resonance frequency (fr); and
  (d) at rotor frequencies above the exclusion zone, apply a second tower-damping force strategy that decreases the tower frequency (ftw) towards or less the tower resonance frequency (fr).

9. The wind turbine according to claim 8, wherein the first rotational frequency (f1) and the second rotational frequency (f2) are defined such that the exclusion zone is equal to or less than +/−3% of the primary rotational frequency (fp).

10. The wind turbine according to claim 8, further comprising a generator with a generator rotor that produces rotational torque, wherein application of the first and second tower-damping strategies comprises controlling the generator with the wind turbine controller to vary the rotational torque from the generator rotor that is imparted to the tower to primarily damp lateral oscillations that are generally perpendicular to an axis of the rotor.

11. The wind turbine according to claim 8, further comprising a pitch control system, wherein application of the first and second tower-damping strategies comprises varying a pitch angle of the rotor blades with the pitch control system to change the rotational frequency of the rotor to primarily damp longitudinal oscillations that are generally parallel to an axis of the rotor.

12. The wind turbine according to claim 8 further comprising:
  a generator with a generator rotor that produces rotational torque, wherein application of the first and second tower-damping strategies comprises controlling the generator with the wind turbine controller to vary the rotational torque from the generator rotor that is imparted to the tower to primarily damp lateral oscillations that are generally perpendicular to an axis of the rotor; and
  a pitch control system, wherein application of the first and second tower-damping strategies comprises varying a pitch angle of the rotor blades with the pitch control system to change the rotational frequency of the rotor to primarily damp longitudinal oscillations that are generally parallel to an axis of the rotor.

\* \* \* \* \*